United States Patent [19]
Sullivan

[11] Patent Number: 5,958,618
[45] Date of Patent: Sep. 28, 1999

[54] BATTERY ASSEMBLY

[75] Inventor: Paul Sullivan, County Cork, Ireland

[73] Assignee: Motorola, Inc., Schaumburg, Ill.

[21] Appl. No.: 08/950,083

[22] Filed: Oct. 14, 1997

[51] Int. Cl.$^6$ .................................................. H01M 2/10
[52] U.S. Cl. ........................ 429/99; 429/100; 429/157; 455/572
[58] Field of Search .................. 429/96, 99, 100, 429/157, 163, 167, 159; 455/572

[56] References Cited

U.S. PATENT DOCUMENTS

| | | | |
|---|---|---|---|
| Re. 28,948 | 8/1976 | Kaye | 429/99 X |
| 4,507,368 | 3/1985 | Hashimoto | 429/94 |
| 4,965,148 | 10/1990 | Daio et al. | 429/159 |
| 5,001,772 | 3/1991 | Holcomb et al. | 429/99 X |
| 5,225,294 | 7/1993 | Schifrin | 429/99 |
| 5,292,566 | 3/1994 | Shacklett, III | 429/167 X |
| 5,443,668 | 8/1995 | Zaborney et al. | 429/176 X |
| 5,472,804 | 12/1995 | Austin et al. | 429/99 |
| 5,601,942 | 2/1997 | Fedele | 429/159 |
| 5,736,271 | 4/1998 | Cisar et al. | 429/96 |

*Primary Examiner*—Maria Nuzzolillo
*Assistant Examiner*—Susy Tsang
*Attorney, Agent, or Firm*—Felipe J. Farley

[57] ABSTRACT

A battery cell stick (100) is formed by vertically-stacking bare rechargeable cylindrical battery cells (110, 120) and then wrapping the cells in a common label (130) having an adhesive backing (132). Subsequently, multiple cell sticks (100, 150) are combined in a single plastic housing (160). The assembly is wrapped with an additional adhesive-backed label (180). Positively- and negatively-polarized terminal ends (112, 152) are exposed through openings (172, 174) in the housing.

2 Claims, 1 Drawing Sheet

BATTERY ASSEMBLY

TECHNICAL FIELD

This invention relates in general to battery devices, such as those used in portable electronic products, and more particularly, to the structure and packaging of battery devices.

BACKGROUND

Portable electronic products, such as radios, cellular telephones, and the like, generally require batteries for supplying power to the product. In many instances, multiple battery cells are needed to meet the power requirements of a product. One common battery cell configuration comprises individual cylindrical battery cells which are vertically stacked, making end-to-end (i.e., lead-to-lead) contact with one another. In lieu of placing multiple individual battery cells into a product, it is often desirable to combine individual cells to form a single battery package. For example, rechargeable (secondary) cells are customarily combined into a single unit for convenience. When cylindrical cells are to be vertically-stacked and combined to form a single battery package it is critical that the structural integrity of the package be maintained, in order to avoid, for example, cell shifting and loss of electrical contact between adjacent cell leads. Exisiting methods of combining multiple cylindrical cells have proved to be inadequate. For example, heat-shrinkable plastic sleeving which has been used to package cells is hightly susceptible to splitting or tearing upon impact when a product incorporating the battery package is dropped.

For the foregoing reasons, it would be desirable to have a battery package in which multiple cylindrical battery cells may be combined in a vertically-stacked configuration without the deleterious effects which are common with existing packaging methods.

DETAILED DESCRIPTION OF THE PREFERRED EMBODIMENT

Figure 2:
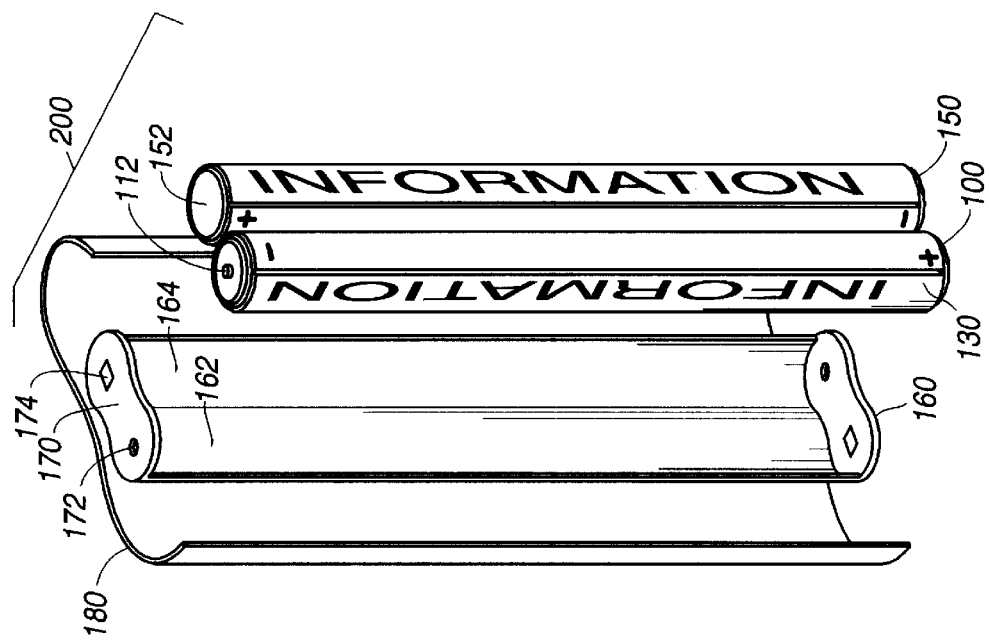
FIG. 2 is an exploded view illustrating a preferred embodiment of the present invention.

While the specification concludes with claims defining the features of the invention that are regarded as novel, it is believed that the invention will be better understood from a consideration of the following description in conjunction with the drawing figures, in which like reference numerals are carried forward.

Figure 1:
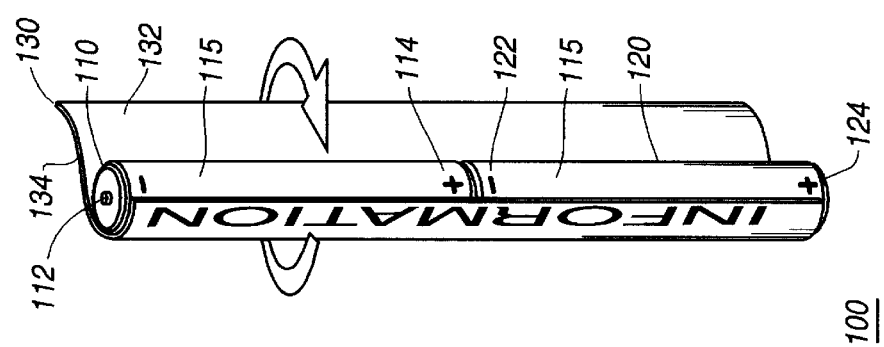
FIG. 1 is a perspective view of a battery cell stick assembly in accordance with the present invention.

Referring now to FIG. 1, a battery cell stick 100 is shown in accordance with the invention. Battery cells 110, 120 are provided for combination into a single battery package. Although only two battery cells are provided here, it would be obvious to one skilled in the art that multiple individual-cells could be incorporated into a single cell stick package. The battery cells 110, 120 each have a negatively-polarized terminal end 112, 122 and a positively-polarized terminal end 114, 124. The battery cells are positioned end-to-end, or vertically stacked, such that the cells make direct and intimate contact at oppositely-polarized terminal ends 114, 122. In some instances, terminal ends 114 and 122 may be joined by a conductive interconnection (not shown) disposed between adjacent cells 110 and 120. The cells 110, 120 have cylindrical-shaped peripheral portions 115 which are wrapped in a common adhesive-backed label 130. The tackiness of the label's adhesive backing 132 provides sufficient friction against the peripheral portions 115 to ensure that the cells remain fixed, positionally, relative to each other. The adhesive backing 132 solves a problem which is prevalent with other packaging methods; namely, the adhesive prevents the cells from sliding or shifting when acted upon by an external force occurring, for example, when the product in which the battery package is incorporated is dropped. Alternate packaging methods, e.g., heat-shrinkable plastic sleeving, have been prone to splitting during drop testing, as a result of battery-shifting upon impact. The rigidity of the cell stick of the present invention may be customized by choosing a label 130 having the appropriate corresponding structural characteristics. The battery label 130 of the present invention also provides an electrically insulating barrier, precluding the need for individual battery cell labels. Furthermore, the label provides a surface 134 for printing pertinent battery package information. Although we intend to use the present invention in the assembly of rechargeable (secondary) battery cell packages, this invention could be employed to package primary (disposable) battery cells as well.

A single battery cell stick may be sufficient for a variety of applications. However, we further envision the combination of multiple battery cell sticks into a single battery package. Referring now to FIG. 2, an exploded view of a preferred embodiment of the present invention is shown. Battery package assembly 200 includes first and second battery cell sticks 100, 150 combined in a plastic molded battery housing 160. Although the preferred embodiment incorporates only two cell sticks, clearly more than two cell sticks could be combined to form a single battery package or assembly. The structure of the battery cell sticks is as described hereinabove. The sticks 100, 150 are received by receiving portions 162, 164 of the housing 160 such that a negatively-polarized terminal end 112 of a first cell stick 100 is exposed through a first aperture or opening 172 formed in the top 170 of the housing 160, and a positively-polarized terminal end 152 of a second cell stick 150 is exposed through a second housing opening 174. Terminal ends 112 and 152 provide electrical contact points between the battery package 200 and internal product circuitry (not shown). Preferably, the plastic battery housing 160 comprises a one-piece molded construction. The housing 160 could be designed to afford a snap-fit between the cell sticks 100, 150 and the housing. One skilled in the art will realize that auxiliary attachment means, e.g., an adhesive disposed between the housing and cell sticks, could be incorporated to provide additional mechanical support to the assembly 200. Once the cell sticks 100, 150 have been attached to the housing 160, an adhesive-backed label 180, similar in construction to the individual cell stick labels 130 is wrapped around the entire assembly. In addition to providing added structural integrity to the assembly, the label preferably contains information about the battery package, e.g., manufacturer, chemical composition, warnings, etc. The battery assembly 200 provides a structurally sound rechargeable battery package which may be efficiently attached to, and detached from, an associated portable electronic device such as a two-way radio.

While the preferred embodiments of the invention have been illustrated and described, it will be clear that the invention is not so limited. For example, the invention could easily be adapted to the packaging of non-cylindrical battery cells. Furthermore, myriad battery housing designs could be employed to form battery packages incorporating battery cell sticks. Numerous modifications, changes, variations, substitutions and equivalents will occur to those skilled in the art without departing from the spirit and scope of the present invention as defined by the appended claims.

What is claimed is:

1. A battery assembly, comprising:

first and second sets of cylindrical battery cells, each battery cell having a positively-polarized terminal end, an opposing negatively-polarized terminal end and a peripheral portion;

first and second adhesive-backed labels; and a plastic housing, said first set of battery cells disposed end-to-end, the first adhesive-backed label wrapped around a peripheral portion of each of the first set of battery cells to form a first cell stick, said second set of battery cells disposed end-to-end, the second adhesive-backed label wrapped around a peripheral portion of each of the second set of battery cells to form a second cell stick, and the first and second cell sticks attached to said plastic housing; and also comprising a third adhesive-backed label wrapped around the entire assembly.

2. A two-way radio having a rechargeable battery package, the battery package comprising:

a first battery cell stick, including:

upper and lower cylindrical battery cells disposed end to end such that a negatively-polarized terminal portion of the upper cell is in direct and intimate contact with a positively-polarized terminal portion of the lower cell, and a first adhesive-backed label wrapped around a peripheral portion of both cells;

a second battery cell stick, including:

upper and lower cylindrical battery cells disposed end to end such that a positively-polarized terminal portion of the upper cell is in direct and intimate contact with a negatively-polarized terminal portion of the lower cell, and a second adhesive-backed label wrapped around a peripheral portion of both cells;

a plastic battery housing, including:

a top, a bottom, and first and second receiving portions, the top having first and second apertures positioned above the corresponding first and second receiving portions; and a third adhesive-backed label, wherein the first and second battery cell sticks are disposed within the corresponding first and second housing receiving portions, the positively-polarized end of the first cell stick upper cell exposed through the first aperture, the negatively-polarized end of the second cell stick upper cell exposed through the second aperture, and the third adhesive-backed label wrapped around the cell sticks and the housing.

* * * * *